(12) United States Patent
Modai et al.

(10) Patent No.: US 9,179,095 B2
(45) Date of Patent: Nov. 3, 2015

(54) SCALABLE MULTI-VIDEOCONFERENCING SYSTEM

(71) Applicant: Avaya Inc., Basking Ridge, NJ (US)

(72) Inventors: Ori Modai, Ramat Hasharon (IL); Yair Wiener, Qiryat Ono (IL)

(73) Assignee: Avaya Inc., Basking Ridge, NJ (US)

( * ) Notice: Subject to any disclaimer, the term of this patent is extended or adjusted under 35 U.S.C. 154(b) by 233 days.

(21) Appl. No.: 13/742,981

(22) Filed: Jan. 16, 2013

(65) Prior Publication Data

US 2014/0085399 A1 Mar. 27, 2014

Related U.S. Application Data

(60) Provisional application No. 61/706,197, filed on Sep. 27, 2012.

(51) Int. Cl.
*H04N 7/14* (2006.01)
*H04N 7/15* (2006.01)
*H04L 29/06* (2006.01)

(52) U.S. Cl.
CPC ............ *H04N 7/15* (2013.01); *H04L 65/403* (2013.01); *H04L 65/605* (2013.01)

(58) Field of Classification Search
None
See application file for complete search history.

(56) References Cited

U.S. PATENT DOCUMENTS

| 5,990,933 | A | * | 11/1999 | Ozone et al. | 348/14.09 |
| 2006/0087553 | A1 | * | 4/2006 | Kenoyer et al. | 348/14.08 |
| 2008/0211901 | A1 | * | 9/2008 | Civanlar et al. | 348/14.09 |
| 2008/0231688 | A1 | * | 9/2008 | Luo | 348/14.09 |
| 2010/0182394 | A1 | * | 7/2010 | Zhan | 348/14.01 |

FOREIGN PATENT DOCUMENTS

| GB | 2443966 A | | 5/2008 | |
| WO | 96/42152 A1 | | 12/1996 | |
| WO | PCT/US96/02978 | * | 12/1996 | H04N 7/14 |

* cited by examiner

*Primary Examiner* — Maria El-Zoobi (57) ABSTRACT

Embodiments disclosed herein provide systems and methods for a scalable videoconference system. In a particular embodiment, a method provides receiving a video stream from a party on a videoconference over a communication network. The method further provides transferring the video stream to a processing device of a plurality of processing devices located on one of a plurality of processing boards operatively coupled to each of one or more server processors. The method further provides processing the video stream to generate a processed video stream and transferring the processed video stream for distribution to other parties on the videoconference.

14 Claims, 6 Drawing Sheets

SCALABLE MULTI-VIDEOCONFERENCING SYSTEM

RELATED APPLICATIONS

This application claims the benefit of U.S. Provisional Application No. 61/706,197, filed Sep. 27, 2012, which is hereby incorporated by reference in its entirety.

TECHNICAL BACKGROUND

Videoconferencing systems manage video communications between multiple parties. The system may handle receipt of video feed from each party and distribute the video feeds to other parties in a particular videoconference. Current videoconferencing systems include passive network architectures, active network architectures, and software based systems. Both the passive and active network architectures do not run on a standard video conferencing server and, while software based systems do execute on a standard server, the software systems do not use any hardware processing devices to bear portions of the videoconference processing from the processors of the server itself.

OVERVIEW

Embodiments disclosed herein provide systems and methods for a scalable videoconference system. In a particular embodiment, a method provides receiving a video stream from a party on a videoconference over a communication network. The method further provides transferring the video stream to a processing device of a plurality of processing devices located on one of a plurality of processing boards operatively coupled to each of one or more server processors. The method further provides processing the video stream to generate a processed video stream and transferring the processed video stream for distribution to other parties on the videoconference.

In a further embodiment, a scalable videoconferencing system is provided comprising one or more server processors. The videoconferencing system further includes one or more processing boards with a plurality of processing devices thereon operatively coupled to each of the one or more server processors. The videoconferencing system further includes the one or more server processors configured to receive a video stream from a party on a videoconference over a communication network and transfer the video stream to a processing device of the plurality of processing devices. The videoconferencing system further includes the processing device configured to process the video stream to generate a processed video stream and transfer the processed video stream for distribution to other parties on the videoconference.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
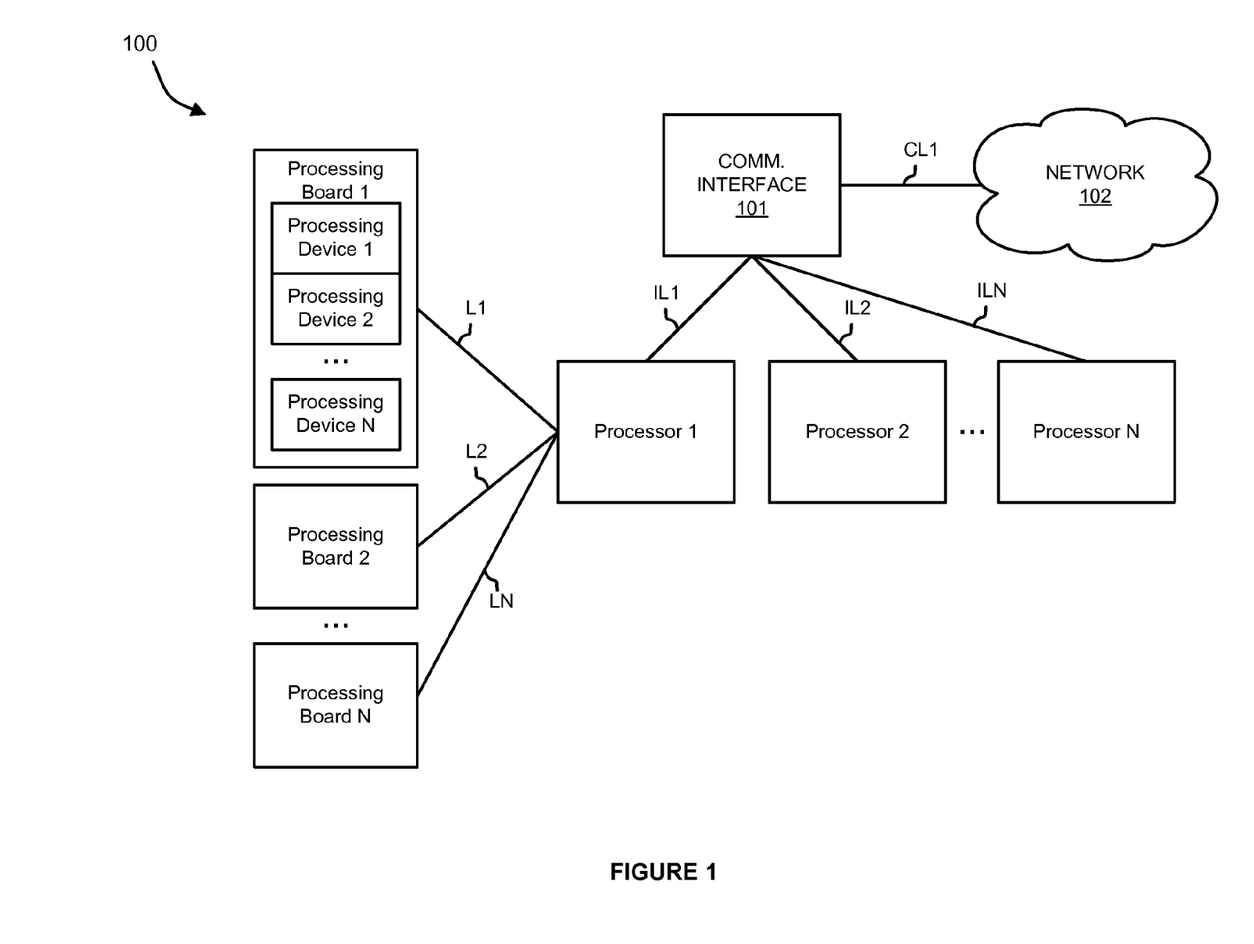
FIG. 1 illustrates a videoconferencing system for scalable processing of videoconference video.

FIG. 1 illustrates videoconference server system 100. Videoconference server system 100 includes processing boards 1-N and processors 1-N. Processing board 1 includes processing devices 1-N. Though not shown for clarity, each of processing boards 2-N also include a set of processing devices 1-N, respectively. Processing boards 1-N communicate with processors 1-N over links L1-LN, respectively. Videoconference server system 100 further includes communication interface 101, which allows processors 1-N to communicate with communication network 102. It should be understood that the values of N may be different for processing boards 1-N, processors 1-N, processing devices 1-N, links L1-LN, and interface links IL1-ILN. Thus, the number of processing boards, processing devices, processors, etc. may be different in accordance with the description below.

In operation, processors 1-N may be microprocessors, such as central processing units (CPUs), microcontrollers, or any other type of processing circuitry capable of operating a server system. Links L1-LN may be part of a system bus on a motherboard that transports traffic between processors 1-N and processing boards 1-N. Likewise, processors 1-N communicate with communication interface 101 over interface links IL1-ILN, which may be included in the same system bus as links L1-LN or included in a separate bus. A system bus may further transport traffic between other computing elements, such as system memory (RAM), hard drives, communication interfaces, or peripheral interfaces. Processing devices 1-N may each be any type of hardware circuitry, such as an application specific integrated circuit (ASIC), designed to process video as described herein.

In some embodiments, each processor may require a northbridge to manage communications between a bus connecting processing boards with the northbridge and a bus connecting the northbridge to the processor. For example, processing boards 1-N may communicate with a northbridge using a Peripheral Component Interconnect Express (PCIe) bus while the processor communicates with the northbridge over a front-side bus. The northbridge functionality may also be included in the circuitry of the processor.

Processing boards 1-N may be installed in videoconferencing server system 100 so as each board is logically assigned to exchange data with a specific processor of processors 1-N. The assigned processor for each board may be selected in such a way that the data path from the processor memory to the board is the shortest (fastest). Furthermore, processing boards 1-N may be installed in videoconferencing server system 100 so as the boards are balanced between each of the processors 1-N.

Communication interface 101 comprises components that communicate over communication links, such as network cards, ports, RF transceivers, processing circuitry and software, or some other communication devices. Communication interface 101 may be configured to communicate over metallic, wireless, or optical links. Communication interface 101 may be configured to use TDM, IP, Ethernet, optical networking, wireless protocols, communication signaling, or some other communication format—including combinations thereof.

Communication network 102 comprises network elements that provide communications services to videoconferencing server system 100. Communication network 102 may comprise switches, wireless access nodes, Internet routers, network gateways, application servers, computer systems, communication links, or some other type of communication equipment—including combinations thereof.

The elements of videoconference server system 100 function to facilitate videoconferences between multiple parties. Videoconference server system 100 acts as a centralized processing system to receive video captured of parties on a videoconference and process that video before transferring the video to other parties on the videoconference. Videoconference server system 100 may be configured to facilitate multiple videoconferences depending on the processing capacity of videoconference server system 100. Advantageously, videoconferencing server system 100 can be scaled to include more or fewer processors and processing boards having their own processing devices 1-N in order to adapt videoconference capacity.

Figure 2:
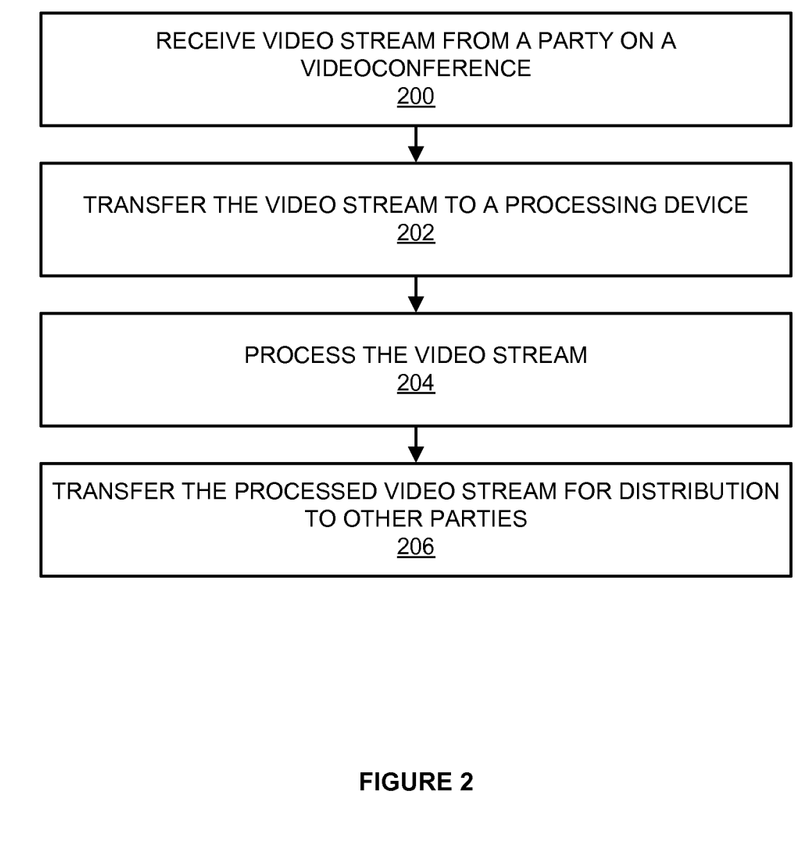
FIG. 2 illustrates the operation of a videoconferencing system for scalable processing of videoconference video.

FIG. 2 illustrates the operation of videoconference server system 100 for scalable processing of videoconference video. Videoconference server system 100 receives a video stream from a party on a videoconference over communication network 102 (step 200). The video stream is received via communication interface 101, which is configured to exchange communications between videoconference server system 100 and communication network 102. The video stream is captured and transferred to videoconference server system 100 by a telephone, laptop computer, desktop computer, tablet computer, gaming system, or any other type of communication device capable of allowing a party to participate in a videoconference. While capturing video of the party, the communication device operated by the party transfers the video stream including that video to videoconference server system 100. The video stream may be transferred through other networks or systems before network 102 routes the video stream to videoconferencing server system 100.

After receiving the video stream, the video stream is transferred to a processing device of processing devices 1-N located on one of processing boards 1-N (step 202). One of processors 1-N receives the video stream from communication interface 101 and determines which processing device should process the video stream. The processor of processors 1-N tasked with managing the transference of the video stream to processing devices may be selected based on conventional server processor task distribution techniques, based on processor loading, based on whether the processor is handling other video streams in the same video conference, or based on any other method of processor selection.

To transfer the video stream, the processor may transfer the video stream data to the selected processing device or the processor may store the video stream data in a memory of videoconferencing server system 100, such as random access memory (RAM), so that the selected processing device can access the video stream from that memory. The processor may select the processing device based on the processing load for processing devices 1-N on each processing board 1-N, based on the processing load for processing boards 1-N, based on whether processing devices are already processing video for the videoconference, randomly, or by any other means of processing device selection.

Upon receiving the video stream, the processing device processes the video stream to generate a processed video stream (step 204). The processing of the video stream may include decoding, encoding, filtering, scaling, combining the video stream with other video streams, adding graphical overlays, or any other type of video processing. The processing device may be capable of processing more than one video stream at a time or may be limited to the single video stream.

The processed video stream is then transferred for distribution to other parties on the videoconference (step 206). The processing device that performed the video processing may transfer the processed video stream back to the processor for transference to other parties via communication interface 101 or may transfer the processed video stream directly to communication interface 101. From communication interface 101 the processed video stream is transferred to the communication devices for other parties on the videoconference.

In an example of the above embodiment, videoconferencing server system 100 is facilitating a videoconference between four parties. Communication interface 101 receives a video stream from each of the four parties and processor 1 directs each video stream to one of processing devices 1-4, respectively, on processing board 1. Although each processing device in this example is only assigned one video stream to process, each processing device may process more than one video stream at a time. Similarly, the video streams may be assigned to non-sequential processing devices as well as processing devices located on other processing boards.

Each of processing devices 1-4 processes each of the respective four video streams to prepare the video streams for viewing by other parties in the videoconference. After processing the processed video streams are transferred back to processor 1, which then manages the distribution of the processed video streams. Processor 1 may direct communication interface 101 to transfer all of the processed video streams to all four devices of the four parties on the videoconference. Alternatively, processor 1 may direct communication interface 101 to only send select processed video streams to various parties. For example, the device of one party to the videoconference may not need to receive the video that the device captured of that party. Therefore, processor 1 directs communication interface 101 to only transfer the other three processed video streams to that device for viewing by the party.

It should be understood that the above video stream processing occurs continually in real time for the duration of a videoconference or until the party disconnects the video stream from the videoconference. It should also be understood that while the above method focuses on the video processing performed to facilitate a videoconferencing session, the video streams processed using the above method may further include audio tracks for the audio portion of the parties' videoconference session.

Figure 3:
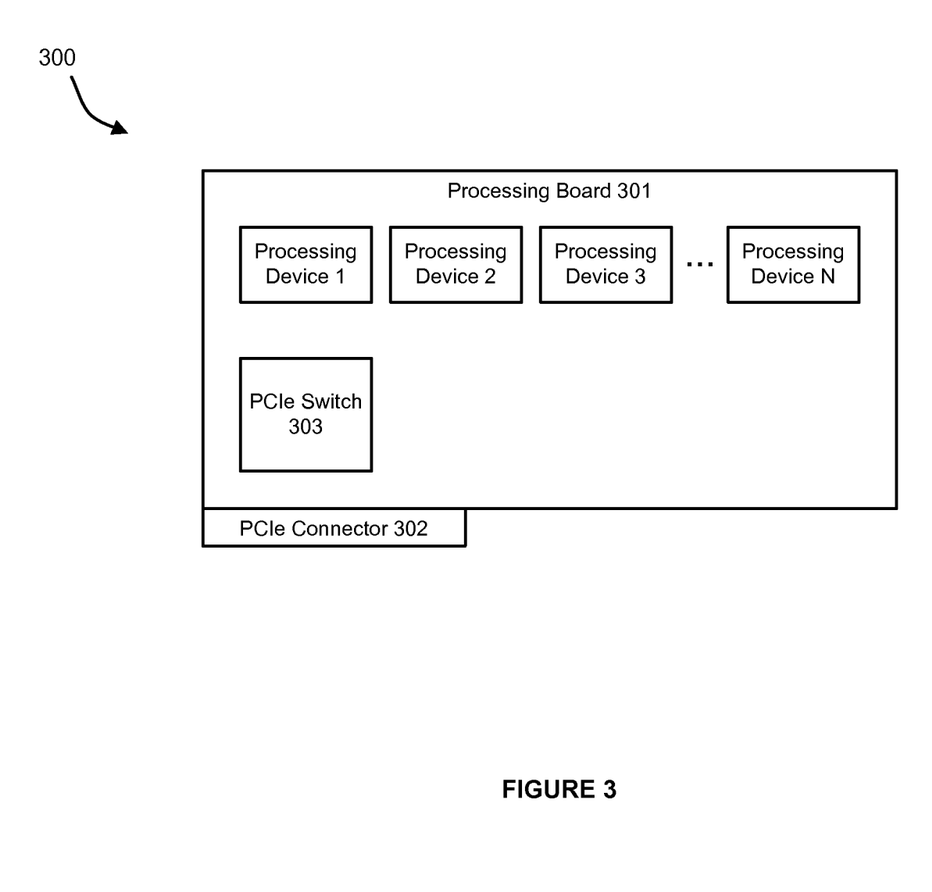
FIG. 3 illustrates a processing board for scalable processing of videoconference video.

FIG. 3 illustrates processing board topology 300 for scalable processing of videoconference video. Processing board topology 301 is an example of one of processing boards 1-N illustrated in FIG. 1, although processing boards 1-N may use alternative configurations. Processing board topology 301 includes processing board 301, which connects to a videoconferencing server system using PCIe connector 302. Processing board 301 includes processing devices 1-N and PCIe switch 303.

Processing devices 1-N are hardware circuitry designed to perform specific aspects of video processing for a videoconferencing server system, such as decoding, encoding, filtering, scaling, combining the video stream with other video streams, adding graphical overlays, or any other type of video processing. Each processing device may be located on a microchip attached to processing board 301 or multiple processing devices may be included on a single microchip. Processing devices 1-N are interconnected to the server through PCIe switch 303 that aggregates data on links with each processing device into a single high capacity link to a PCIe bus in a videoconferencing server system via PCIe connector 302. PCIe switch 303 may contain an internal direct memory access (DMA) engine to offload some of the PCIe traffic load from the videoconferencing server system. If processing board 301 only includes a single processing device, then PCIe switch 303 is optional.

In operation, if selected to process a video stream by a processor of a videoconferencing server system, a processing device of processing devices 1-N receives the video stream via PCIe connector 302 and PCIe switch 303 and processes the video stream. The processing device may receive parameters from the processor that indicate which processing functions should be performed and how those processing functions should be performed. For example, if one of the processing functions is scaling the video stream, then the processing device may receive parameters indicating a resolution to which the video stream should be scaled. Alternatively, the processing device may be configured to perform processing functions using default parameters if no parameters are received from the processor of if the processing device is not configured to receive parameters. After processing, the video stream is transferred back to the videoconferencing server system via PCIe switch 303 and PCIe connector 302.

Figure 4:
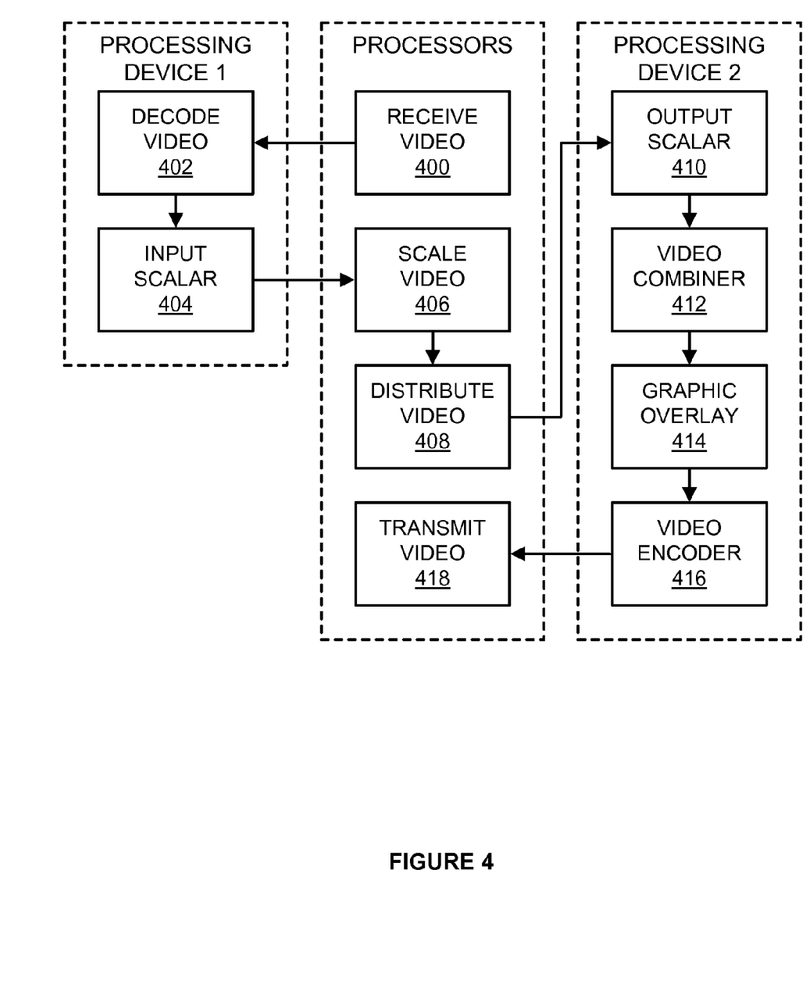
FIG. 4 illustrates the operation of a videoconferencing system for scalable processing of videoconference video.

FIG. 4 illustrates the operation of a videoconference server system for scalable processing of videoconference video. In this embodiment, multiple processing devices are use to process video streams on a videoconference. The outlined boxes indicate which method steps occur in a first processing device, a second processing device, and server processors.

A server processor of one or more server processors in a videoconferencing server system receives a video stream from a party in a videoconference (step 400). The video stream is encoded in a format that is supported by the videoconferencing server system. The video stream is received from a communication interface for the videoconference server system, which connects the videoconference server system with a communication network. The communication network may be an Ethernet network, the Internet, or some other type of communication network—including combinations thereof. In an example, the devices of the parties on the videoconference are all connected to the Internet and can therefore exchange videoconference communications with the videoconference server system from anywhere an Internet connection can be made.

After receiving the video stream, the server processor selects a first processing device to process the video stream and transfers the video stream to the selected processing device. The first processing device decodes the video stream (step 402). The video stream may need to be decoded so that additional processing can be performed on the video stream that could not have otherwise been performed had the video stream still been encoded. The decoded video stream is either decoded into a raw video format or some other video format that can be used for further video processing.

After decoding the video stream or as the video stream is being decoded, the video stream is scaled to adjust the size of the frames within the video stream to be a size that may be required by the videoconferencing server system (step 404). For example, the videoconferencing server system may require that the resolution of the video stream be at or below a particular resolution. Therefore, if the video stream is received at a greater resolution than is required by the system, then the first processing device will adjust the resolution of the video stream to meet the required resolution. Scaling the video stream to at or below a maximum resolution allows for the video stream to consume less bandwidth in the videoconferencing server system. If no scaling is required by the videoconferencing server system, then step 404 may be omitted.

The first processing device transfers the video stream back to the one or more server processors after the video stream has been processed. The first processing device may transfer the video stream back to the processor that transferred the video stream to the first processing device or may transfer the video stream to a different processor. The processor receives the video stream and determines all output resolutions that are required for the video stream in the videoconference. For example, one device on the videoconference may require the video stream to have one resolution while another device may require a different resolution. The processor then scales the video stream in accordance with the determined resolutions (step 406). In some cases, multiple versions of the video stream will result from the scaling, with each version having a resolution required by one or more destination devices in the videoconference. For each of the scaled video streams, the processor selects a second processing device to perform further processing on the video streams. The distribution process of the scaled video streams to processing devices may span across multiple processors in the server and may be optimized using multicast transmission.

Upon being received by the second processing device, the scaled video stream is further scaled if necessary (step 410). This scaling may be necessary to based on the additional processing that is to be performed on the second processing device or for any other reason that the video stream may require further scaling.

The scaled video is then combined with other scaled video streams for other parties on the videoconference to produce a single scaled video stream (step 412). The second processing device may use any possible image configuration to combine the video streams into a single video stream. For example, during a conference call with five parties, the second processing device may receive four scaled video streams from the server processors corresponding to each of four parties on the conference call. From these four video streams, the second processing device combines the video images into a single image for display to the fifth party on the call. For instance, each of the four video streams may be combined to display on a quarter of the combined video image, respectively. Graphic overlays are then added to the combined video stream (step 414). The graphic overlays may include logos, party names, party usernames, call time, party locations, or any other type of graphical information.

After adding the graphic overlays, the second processing device encodes the combined video stream (step 416). The video may be in encoded using any video codec known in the art. The video codec may be a default video codec or may be based on the codec capabilities of the device(s) to which the video stream will be sent. The video codec parameters may be indicated to the second processing device by the server processor(s) that transfers the video streams to the second processing device.

Once encoded, the combined video stream is transferred back to a server processor. The server processor prepares and sends the packet for the combined video stream to a communication interface for transmission over a communication network to parties on the videoconference (step 418). The combined video stream may be transmitted to a single party on the videoconference or transmitted to multiple parties on the videoconference. Which parties receive the combined video stream may depend on whether the parties have been selected to receive the same combined video stream and are using devices configured to receive and display video with the same parameters, such as video having the same scale, codec, or other video parameter.

Based on the preceding embodiment, the server processors receive video streams from multiple parties on a videoconference and then transfer each of the video streams to a processing device for a first portion of processing. Each video stream may be transferred to separate processing devices or a single processing device may be capable of processing multiple video streams simultaneously. After the processing devices have performed the first portion of processing on the video streams, the video streams are transferred back to the server processors and the server processors determine which processing streams should be received by each of the parties on the videoconference. The server processors may determine that multiple scaled versions of the video streams are necessary for different devices on the videoconference. Therefore, the server processors generate additional versions of the video streams having different scaled resolutions.

After determining which parties should receive which video streams, the server processors select other processing devices to perform the processing necessary to combine the video streams into a combined video stream for transfer to the selected parties. For each combined video stream that the processors determine is necessary for the videoconference a separate processing device may be selected to process the video streams into a combined video stream. Thus, if only one combined video is necessary for all parties on the call, then a single processing device is selected for processing while multiple combined video streams would require a number of processors equal to the number of combined video streams. Alternatively, a single processing device may be capable of generating multiple combined video streams.

After the selected processing devices generate the combined video streams, the combined video streams are transferred back to the server processors. The server processors then direct a communication interface to transfer each respective combined video stream to the party or parties for which each combined video stream was created.

Figure 5:
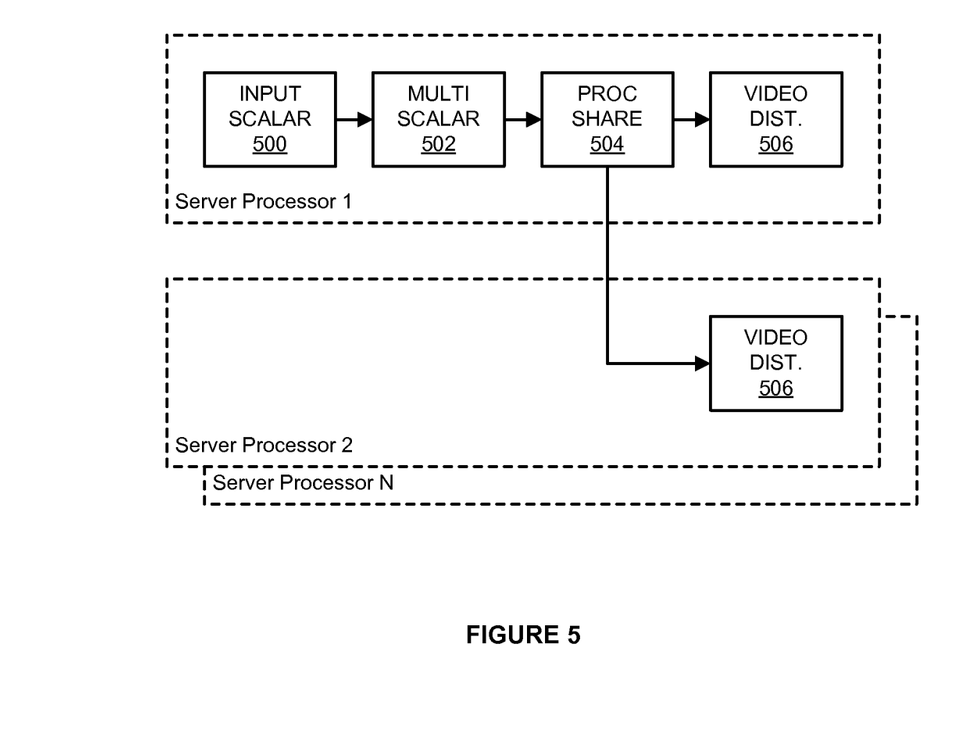
FIG. 5 illustrates processor load balancing for scalable processing of videoconference video.

FIG. 5 illustrates the operation of a videoconferencing server system for multi processor load balancing for scalable processing of videoconference video. Specifically, a video conferencing server system may balance memory throughput and CPU utilization on the server processors in the manner illustrated in FIG. 5. Each processor 1-N is assigned a predefined set of processing boards that are "owned" by the processor such that the processor controls which video stream processing duties are performed by the owned boards and corresponding processing devices. After processing a video stream, each processing device transfers the decoded video stream to an assigned server memory. The processor that owns the board on which the processing device was located, processor 1 in this example, identifies input video frames from local memory for the processor and selects a video frame for processing (step 500). The selection may be made according to criteria, such as the age of the frame, the load per input stream, the amount of output resolutions that are needed per stream, the stream belongs to an active speaker on the videoconference, etc.

After selection processor 1 runs a multi scaler function that scales the input frame to all its required output resolutions (step 502). After scaling processor 1 determines whether the scaler outputs are required by processing devices on boards owned by a different processor. If other processing devices require one or more scaler outputs, then the required resolutions will be shared with the other processor by copying each scaler output to the relevant processor's local memory (step 504). In some embodiments, the copying is performed using a non-uniform memory access (NUMA) aware memory placement. Each processor then identifies the output resolutions that are required for transmission to the target devices of the parties on the videoconference and sends the required frames to the processing devices on boards owned by each respective processor for processing (step 506).

Figure 6:
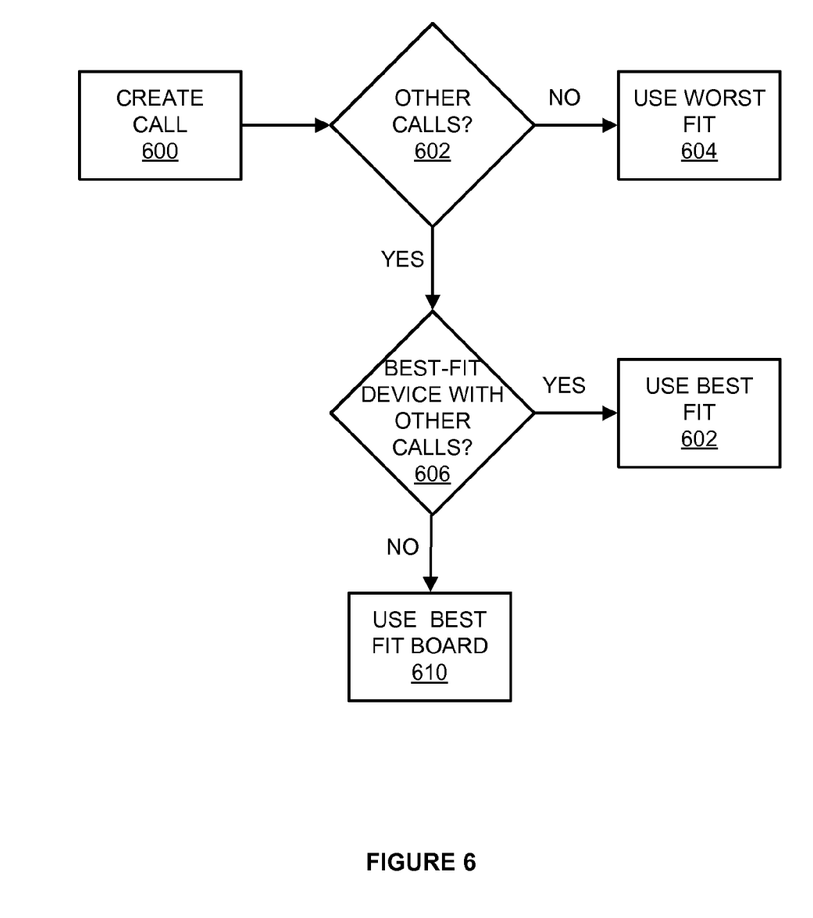
FIG. 6 illustrates processing device selection for scalable processing of videoconference video.

FIG. 6 illustrates the operation of a videoconferencing server system to distribute video streams for scalable processing of videoconference video. In order to reduce memory utilization, a videoconferencing server system may use multicast transmission for transferring raw video. Multicast is beneficial since, much of the time, participants of the same videoconference are viewing the same video layout and the same participants, such as the active speaker. Thus, when a videoconference call is created in the system, the system will select the most optimal processing device (resource) for handling the call (step 600).

The processors determine whether the created call that is created is the first call in a videoconference (step 602). If the call is the first call in the videoconference, then the processors use a worst fit algorithm to determine a processing device for the call and fit the call to the worst fit board and processing device (step 604). If the call is not the first call in the videoconference, then the processors determine whether a best-fit processing device exists for processing the call (step 606). A processing device may be best-fit if the processing device is processing other calls on the videoconference. If a best-fit processing device exists, then the processors fit the call to the best-fit processing device for processing (step 608). If a best-fit processing device does not exist, select a processing device on a best-fit processing board with other processing devices that are processing other calls from the same videoconference (step 610).

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a videoconferencing system, comprising:
 receiving a first video stream from a first party on a videoconference over a communication network;
 transferring the first video stream to a first processing device of a plurality of processing devices located on one of a plurality of processing boards operatively coupled to each of one or more server processors;
 processing the first video stream to generate a first processed video stream;
 receiving a second video stream from a second party on the videoconference over the communication network;

transferring the second video stream to a second processing device of the plurality of processing devices;
processing the second video stream to generate a second processed video stream;
transferring the first processed video stream and the second processed video stream to at least one server processor of the one or more server processors;
in the at least one server processor, scaling the first processed video stream and second processed video stream in accordance with resolution requirements of devices to which the first processed video stream and the second processed video stream will be transferred;
transferring the first processed video stream and the second processed video stream to a third processing device of the plurality of processing devices and further processing the first processed video stream and the second processed video stream, wherein further processing the first processed video stream and the second processed video stream comprises combining the first processed video stream with the second processed video stream to generate a combined video stream; and
transferring the combined video stream for distribution to parties on the videoconference.

2. The method of claim 1, further comprising:
transferring at least one of the first processed video stream and the second processed video stream to a fourth processing device of the plurality of processing devices; and
further processing the at least one of the first processed video stream and the second processed video stream before transferring the first processed video stream for distribution to other parties on the videoconference.

3. The method of claim 2 wherein further processing comprises overlaying graphics onto the processed video stream.

4. The method of claim 2, wherein further processing comprises encoding the processed video stream.

5. The method of claim 1, wherein processing the first video stream comprises decoding the first video stream.

6. The method of claim 1, further comprising:
if the video stream is the first call on the videoconference, selecting the processing device using a worst fit algorithm; and
if the video stream is not the first call on the videoconference, selecting the processing device using a best fit algorithm.

7. The method of claim 1, wherein the plurality of processing boards are coupled to the one or more server processors via a Peripheral Component Interconnect Express (PCIe) bus.

8. A videoconferencing system, comprising:
one or more server processors;
one or more processing boards with a plurality of processing devices thereon operatively coupled to each of the one or more server processors;
the one or more server processors configured to receive a first video stream from a party on a videoconference over a communication network and transfer the first video stream to a first processing device of the plurality of processing devices;
the first processing device configured to process the first video stream to generate a first processed video stream and transfer the first processed video stream to at least one server processor of the one or more server processors;
the one or more server processors configured to receive a second video stream from a second party on the videoconference over the communication network and transfer the second video stream to a second processing device of the plurality of processing devices;
the second processing device configured to process the second video stream to generate a second processed video stream and transfer the second processed video stream to at least one server processor of the one or more server processors;
the at least one server processor configured to scale the first processed video stream and second processed video stream in accordance with resolution requirements of devices to which the first processed video stream and the second processed video stream will be transferred;
the at least one server processor configured to transfer the first processed video stream and the second processed video stream to a third processing device of the plurality of processing devices; and
the third processing device configured to combine the first processed video stream with the second processed video stream to generate a combined video stream and transfer the processed video stream for distribution to other parties on the videoconference.

9. The videoconferencing system of claim 8, further comprising:
the one or more server processors configured to transfer at least one of the first processed video stream and the second processed video stream to a fourth processing device of the plurality of processing devices; and
the fourth processing device configured to further process the at least one of the first processed video stream and the second processed video stream before transferring the at least one of the first processed video stream and the second processed video stream for distribution to other parties on the videoconference.

10. The videoconferencing system of claim 9, further comprising:
the fourth processing device configured to overlay graphics onto the at least one of the first processed video stream and the second processed video stream.

11. The videoconferencing system of claim 9, further comprising:
the fourth processing device configured to encode the at least one of the first processed video stream and the second processed video stream.

12. The videoconferencing system of claim 8, further comprising:
the first processing device configured to process the first video stream by decoding the first video stream.

13. The videoconferencing system of claim 8, further comprising:
the one or more server processors configured to select the processing device using a worst fit algorithm if the video stream is the first call on the videoconference and select the processing device using a best fit algorithm if the video stream is not the first call on the videoconference.

14. The videoconferencing system of claim 8, further comprising:
a Peripheral Component Interconnect Express (PCIe) bus that couples the plurality of processing boards to the one or more server processors.

* * * * *